(12) United States Patent
Latimer

(10) Patent No.: US 8,783,558 B2
(45) Date of Patent: Jul. 22, 2014

(54) IMAGE-BASED CHECK DEPOSITING AUTOMATED TELLER MACHINE (ATM) AND METHOD OF OPERATING AN IMAGE-BASED CHECK DEPOSITING ATM

(75) Inventor: Paul J. Latimer, Waterloo (CA)

(73) Assignee: NCR Corporation, Duluth, GA (US)

( * ) Notice: Subject to any disclaimer, the term of this patent is extended or adjusted under 35 U.S.C. 154(b) by 944 days.

(21) Appl. No.: 12/421,913

(22) Filed: Apr. 10, 2009

(65) Prior Publication Data

US 2010/0258619 A1    Oct. 14, 2010

(51) Int. Cl.
*G06Q 40/00* (2012.01)
(52) U.S. Cl.
USPC .......................................................... 235/379
(58) Field of Classification Search
USPC .......................................................... 235/379
See application file for complete search history.

(56) References Cited

U.S. PATENT DOCUMENTS

| 6,019,286 | A * | 2/2000 | Li et al. | 235/454 |
| 7,266,230 | B2 * | 9/2007 | Doran | 382/137 |
| 2004/0236691 | A1 * | 11/2004 | Force et al. | 705/43 |
| 2007/0084911 | A1 * | 4/2007 | Crowell | 235/379 |

* cited by examiner

*Primary Examiner* — Michael G Lee
*Assistant Examiner* — David Tardif
(74) *Attorney, Agent, or Firm* — Michael Chan

(57) ABSTRACT

A method of operating an image-based self-service check depositing terminal comprises receiving from a customer a check to be deposited, capturing image data which is representative of a first check image, binarizing the captured image data to provide a second check image which is a binary form of the first image, determining a check image quality value associated with the second image, comparing the quality value with a first threshold, transmitting the second image to a back office facility when the quality value is outside of the first threshold, comparing the quality value with a second threshold which is different from the first threshold, returning the check to the customer when the quality value is outside of the second threshold, and transmitting the first image to a back office facility when the quality value is between the first and second thresholds.

17 Claims, 5 Drawing Sheets

IMAGE-BASED CHECK DEPOSITING AUTOMATED TELLER MACHINE (ATM) AND METHOD OF OPERATING AN IMAGE-BASED CHECK DEPOSITING ATM

BACKGROUND

The present invention relates to self-service check depositing, and is particularly directed to an image-based check depositing automated teller machine (ATM) and method of operating an image-based check depositing ATM.

A typical check depositing ATM allows an ATM customer to deposit a check (without having to place the check in any deposit envelope) in a public access, unattended environment. To deposit a check, an ATM customer inserts a customer identification card through a user card slot at the ATM, enters the amount of the check being deposited, and inserts the check through a check slot. A check transport mechanism receives the inserted check and transports the check in a forward direction along a check transport path to a number of locations within the ATM to process the check. If the check is not accepted for deposit, the check is returned to the ATM customer via the check slot. If the check is accepted for deposit, the amount of the check is deposited into the ATM customer's account and the check is transported to and stored in a storage bin within the ATM. An endorser printer prints an endorsement onto the check as the check is being transported to the storage bin.

Checks stored in the storage bin within the ATM are periodically (usually daily) picked up and physically transported via courier to a back office facility of a financial institution. At the back office facility, the checks are prepared at a document preparation workstation for subsequent processing in an image-based check processing system located at the back office facility. In a first pass of checks through the image-based check processing system, check image data which is representative of images of the checks is captured. Then in a second pass of checks through an image-based check processing system, the checks are encoded and sorted and matched up with their corresponding check image data which was previously captured during the first pass of checks. The second pass of checks may be made through either the same image-based check processing system that the first pass of checks was made or a different image-based check processing system. Checks are processed in the first and second passes through the image-based check processing system(s) for purpose of clearing checks between financial institutions, as is known.

As an alternative to capturing check image data in a first pass of checks through an image-based check processing system located at the back office facility (which requires the checks to be physically transported from the ATM to the back office facility before the first pass of checks can be performed), check image data may be initially captured at the ATM. An image-based check depositing ATM is needed to capture check image data which is representative of checks deposited at the ATM. In a typical image-based check depositing ATM, check image data is initially captured in a "first pass" of checks through the ATM. The remotely-captured check image data is then sent electronically to the back office facility. Then, in a "second pass" at the back office facility, the check image data received from the ATM is further processed as required to clear checks between financial institutions.

From time to time, a check image represented by check image data which has been captured in the "first pass" through the image-based check depositing ATM may be of suspect or problematic image quality. For example, after the remotely-captured check image data has been sent electronically to the back office facility, an operator at the back office facility may determine that the quality of the image represented by the check image data is of insufficient quality. If this should occur in known image-based check depositing ATMs, a service operator may need to be dispatched to the particular ATM to retrieve the particular check and process the retrieved check as an exception item through a normal exception processing infrastructure. The cost of dispatching a service operator to an ATM to retrieve a particular check, so that the retrieved check can be processed as an exception item, is usually relatively high. It would be desirable to reduce the number of service trips which need to be made by service operators to remote image-based check depositing ATMs.

SUMMARY

In accordance with an embodiment of the present invention, a method of operating a publicly-accessible image-based self-service check depositing terminal comprises receiving from a self-service depositor customer a check to be deposited, capturing non-binary image data which is representative of a non-binary image of the check, binarizing the non-binary image data to provide binarized data which is representative of a binary image of the check, determining a check image quality value associated with the binary image of the check, comparing the check image quality value with a first threshold value, transmitting the binarized data to a back office facility of an institution when the check image quality value is outside of the first threshold value, comparing the check image quality value with a second threshold value which is different from the first threshold value, returning the check to the self-service depositor customer when the check image quality value is outside of the second threshold value, and transmitting the non-binary image data to a back office facility of an institution when the check image quality value is between the first and second threshold values.

DETAILED DESCRIPTION

The present invention is directed to an image-based check depositing automated teller machine (ATM) and method of operating an image-based check depositing ATM.

Figure 1:
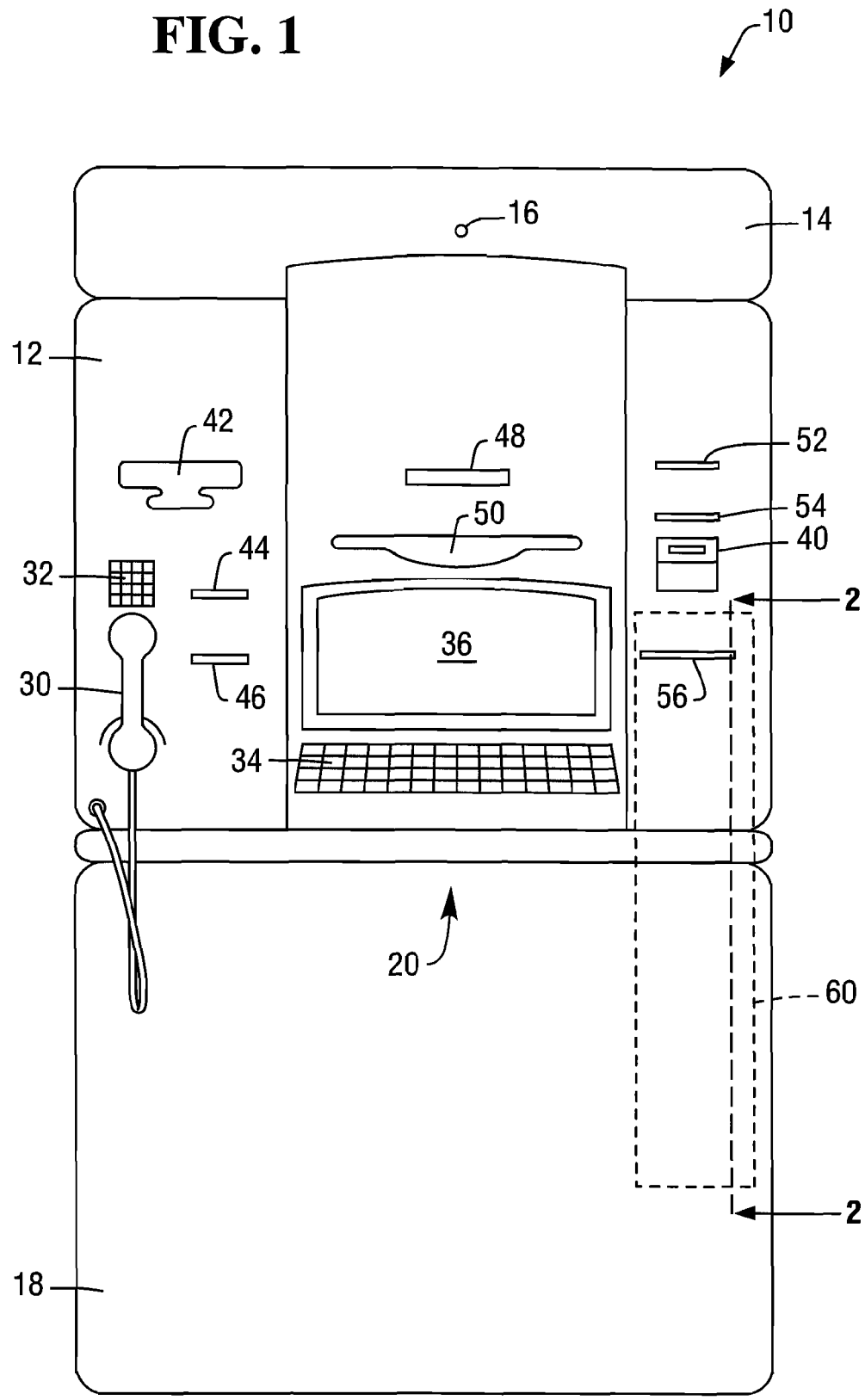
FIG. 1 is a pictorial diagram of an image-based check depositing automated teller machine (ATM)

Referring to FIG. 1, an image-based self-service depositing terminal, such as an image-based check depositing ATM 10, at which a check can be deposited is illustrated. The check depositing ATM 10 comprises a fascia 12 pivotably coupled to a chassis (not shown), an upper panel 14 mounted to the chassis and defining an aperture 16 through which a camera (not shown) images a customer of the ATM 10, and a lower panel 18 hingeably coupled to the chassis so that the lower panel 18 can be opened to reveal a safe (not shown) mounted in the chassis. When the lower panel 18 is open, the fascia 12 can be pivoted upwards to reveal ATM modules mounted within the chassis.

The fascia 12 and lower panel 18 provide a user interface 20 for allowing an ATM customer to execute a transaction. The fascia 12 includes a handset 30 and a telephone keypad 32 for allowing an ATM customer to contact a remote operator (not shown) typically located in a call center (not shown). The fascia 12 also includes an encrypting keyboard 34 for allowing an ATM customer to enter transaction details, and a display 36 for presenting screens to an ATM customer. The fascia 12 also defines eight slots for receiving and dispensing media items, and a tray 40 into which coins can be dispensed. The slots include a money order printer slot 42, a bunch note input slot 44, a bunch note exit slot 46, a statement output slot 48, a cash dispense slot 50, a card reader slot 52, a card issue slot 54, and a check input/output slot 56. The slots 42 to 56 and tray 40 are arranged so that when the fascia 12 is closed, the slots and tray align with corresponding ATM modules mounted within the ATM's chassis (not shown). The user interface features described above are all provided on an NCR PERSONAS (trade mark) 5878 financial services center ATM, available from NCR Financial Solutions Group Limited, Discovery Centre, 3 Fulton Road, Dundee, DD2 4SW, Scotland.

Figure 2:
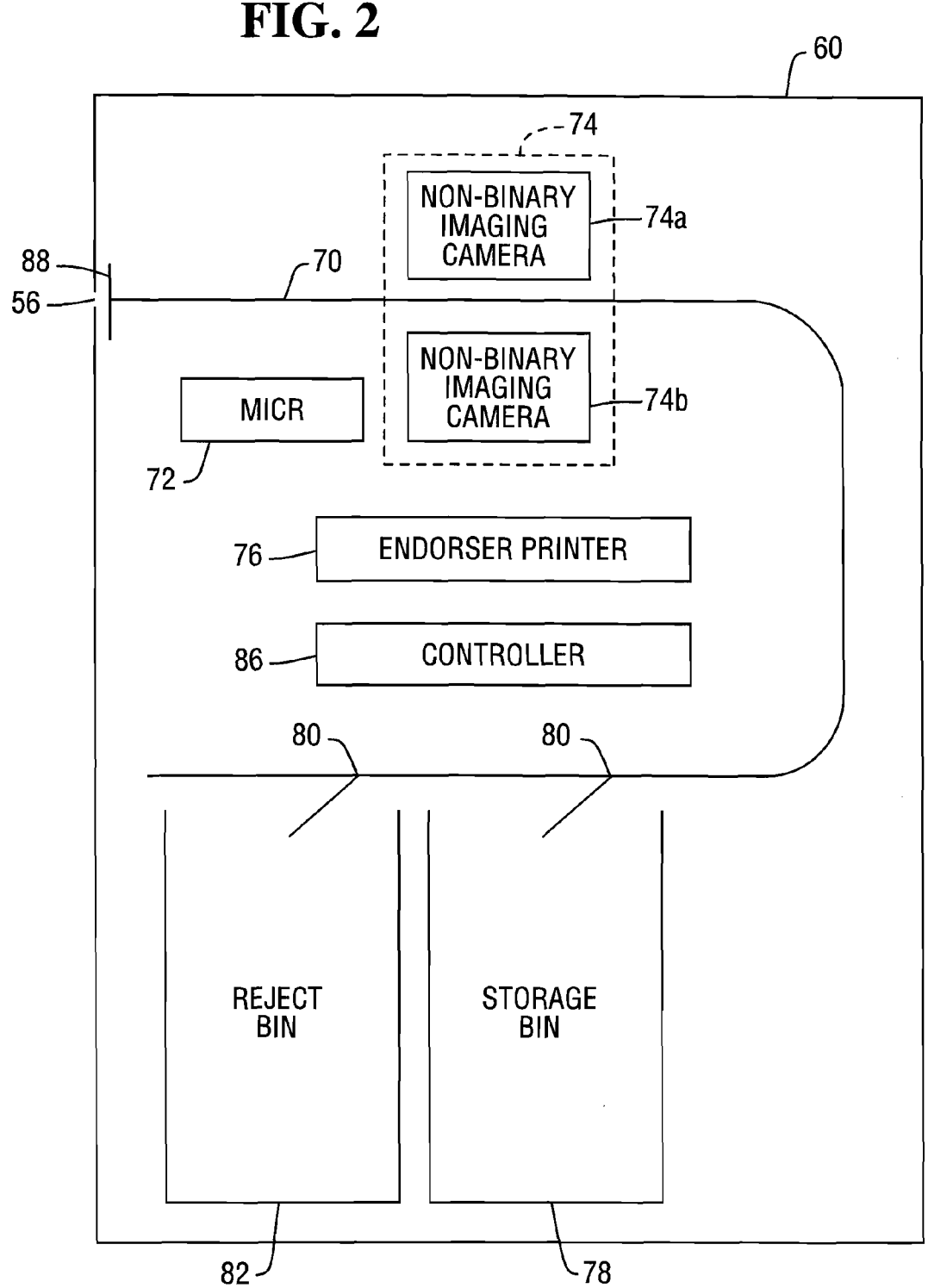
FIG. 2 is a simplified schematic sectional diagram, taken approximately along line 2-2 in FIG. 1, and showing a part (a check processing module) of the ATM of FIG. 1.
Figure 3:
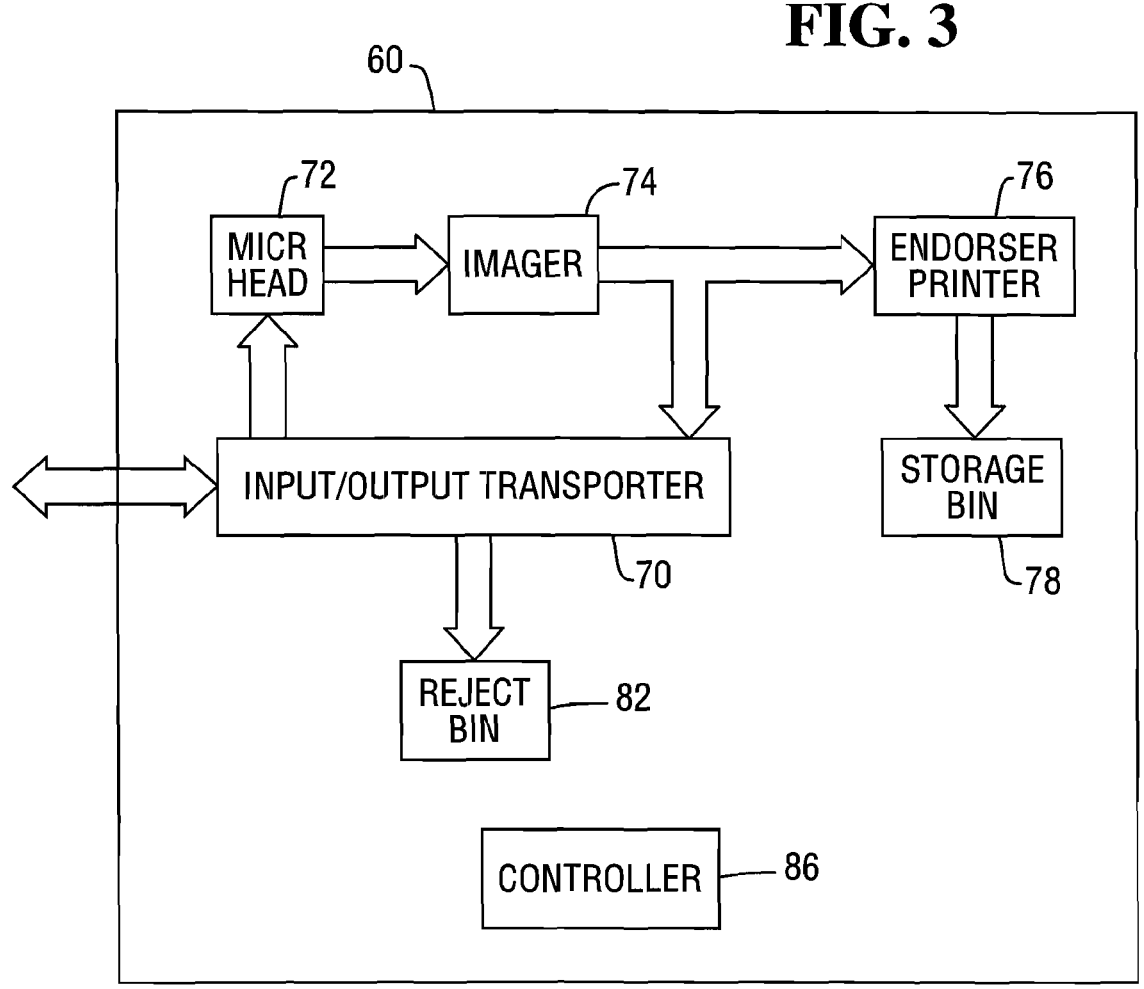
FIG. 3 is a block diagram of the check processing module of FIG. 2.

A check processing module (CPM) 60 will now be described with reference to FIG. 2 and FIG. 3. FIG. 2 is a simplified schematic sectional diagram (along line 2-2 in FIG. 1) showing part of the fascia 12 and lower panel 18, and the main parts of the CPM 60. FIG. 3 is a block diagram illustrating the main elements in the CPM 60. The CPM 60 is a modified version of a conventional check processing module, such as the check processing module provided with the PERSONAS (trade mark) 5878 NCR ATM.

The CPM 60 comprises the following elements: a check input/output transport mechanism 70 including an alignment mechanism for aligning a check; a magnetic ink character recognition (MICR) head 72 for reading magnetic details on a code line of a check; an imager 74 including an upper 74a and lower 74b imaging camera for capturing non-binary images (front and back) of a check; a printer 76 for endorsing a check; a storage bin 78 for storing processed checks; and a reject bin 82 for storing rejected checks. The transport mechanism 70 includes a divert gate 80 for diverting checks to either the storage bin 78 or the reject bin 82. The elements are conventional and will not be described in detail herein. The CPM 60 also includes a controller 86 for controlling the operation of the elements within the CPM 60. The CPM 60 also includes a slot entrance shutter 88 for opening and closing the check input/output slot 56.

Figure 4A:
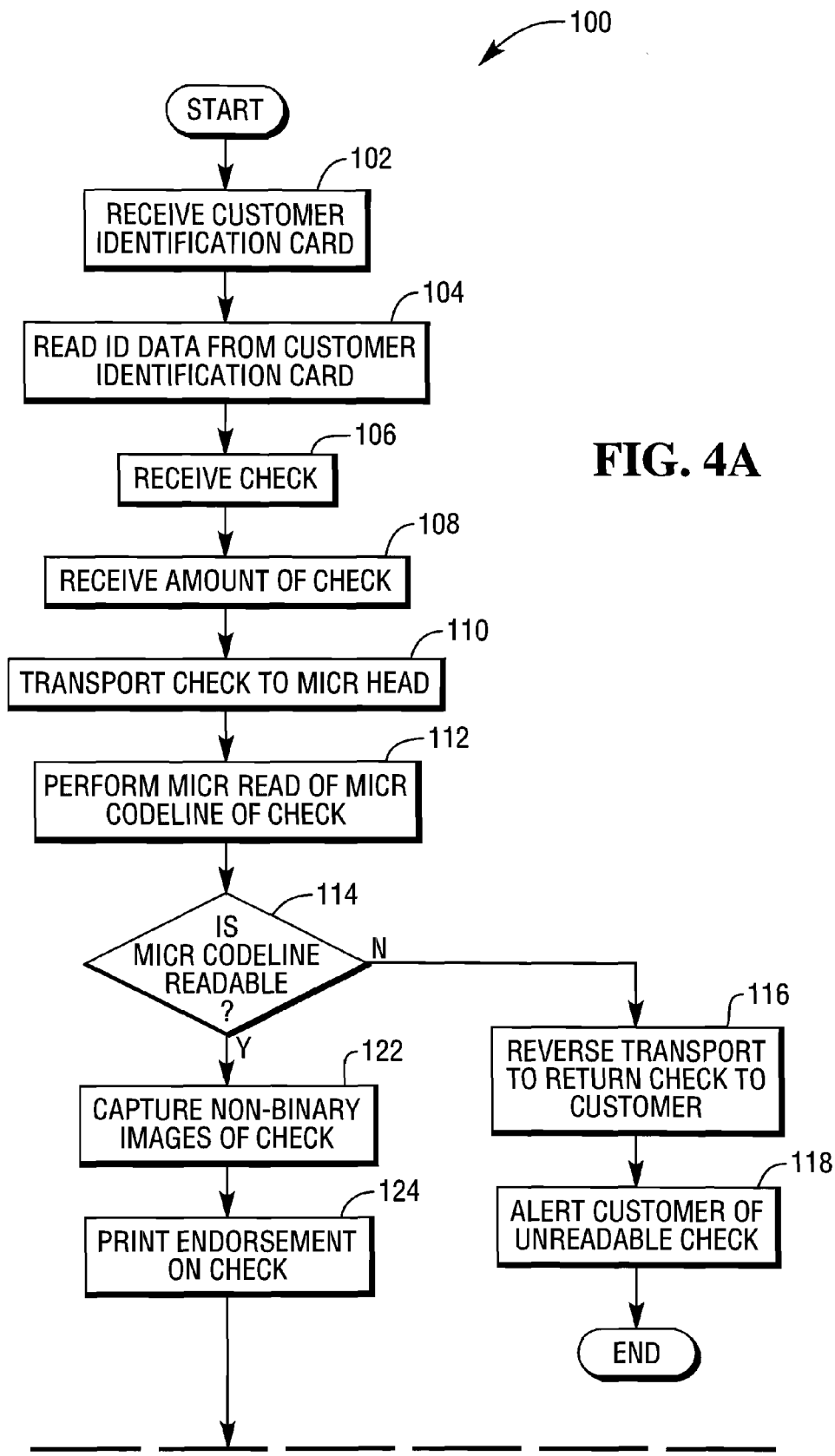
FIG. 4 is a flowchart illustrating steps involved in a check depositing operation.
Figure 4B:
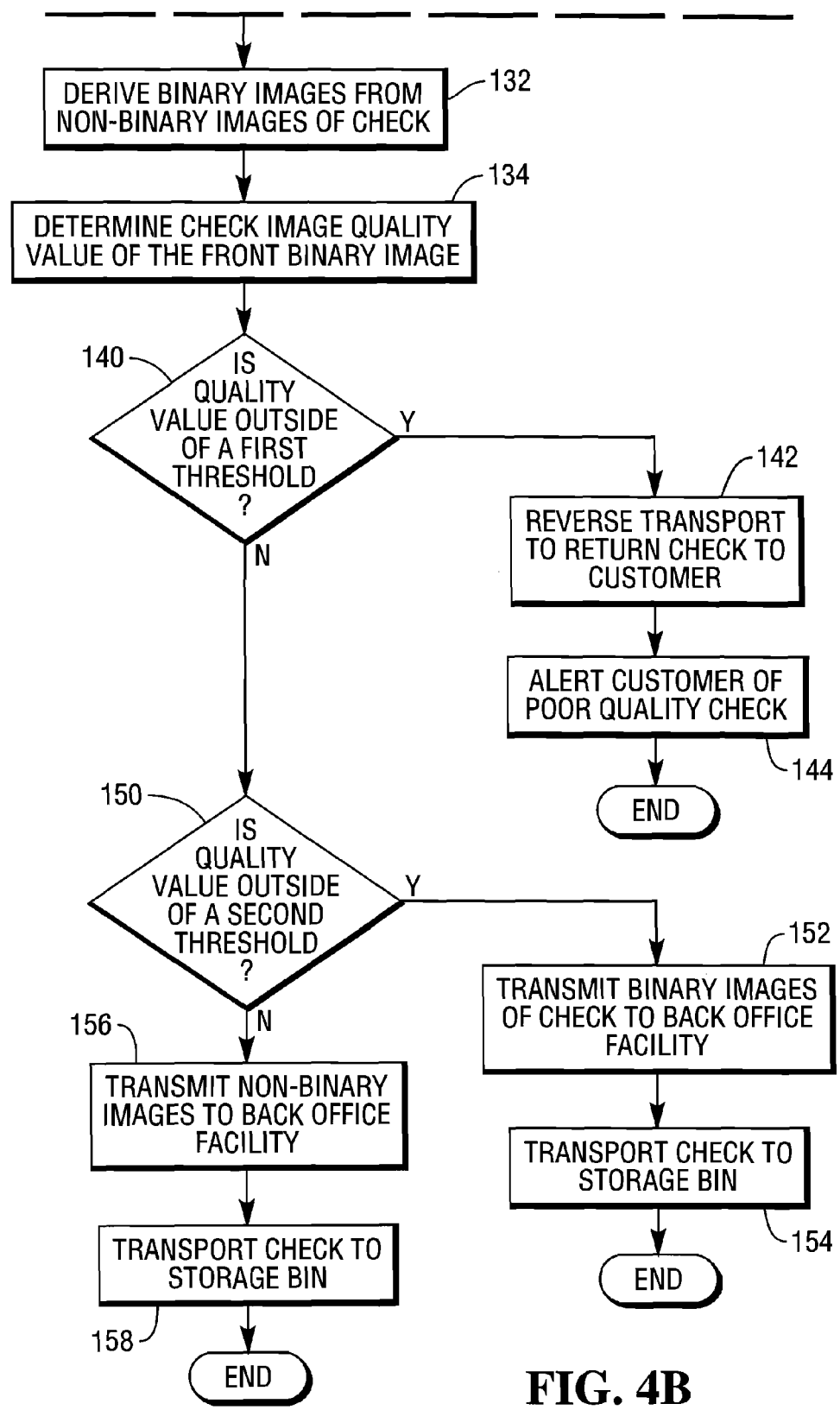

A typical check depositing transaction will now be described with reference to FIG. 4 which is a flowchart 100 illustrating steps involved in a check depositing transaction, and also with reference to FIGS. 1 to 3. In this transaction, the ATM customer enters a customer identification card into the card reader slot 52 (steps 102 and 104), selects "check depositing" from a list of transaction options presented on the display 36, enters the amount of the check via the keyboard 34, and inserts the check to be deposited through the check input/output slot 56 (step 106). The controller 86 receives the amount of the check (step 108), and opens the slot entrance shutter 88. The transport mechanism 70 receives the check and transports the received check (step 110) to the MICR head 72 where the MICR codeline on the check is read (step 112).

A determination is made (step 114) as to whether the MICR codeline can be read from the check. If the MICR codeline data from the check is unreadable as determined in step 114, then a check return operation is initiated. When this occurs, the transport mechanism 70 reverses the direction of transport (step 116) to convey the check to the check input/output slot 56 to return the check to the ATM customer via the check input/output slot. The ATM customer is then alerted of an unreadable check (step 118).

However, if the MICR codeline data from the check is readable as determined in step 114, then the transport mechanism 70 transports the check to the imager 74, where non-binary images of the check are captured (step 122). For example, the non-binary images of the check may be grayscale images of the check. As another example, the non-binary images of the check may be color images of the check. For simplicity of description below, the non-binary images of the check will be assumed to be grayscale images of the check. The printer 76 prints endorsement data onto the check (step 124).

Binary images are derived from the grayscale images of the check (step 132). Techniques to derive binary images from grayscale images are known. Accordingly, details of such techniques will not be discussed. The grayscale images of the check are electronically stored in a memory device (not shown) at the ATM 10, and the binary images of the check are processed further as described hereinbelow.

A check image quality value is determined for the front binary image of the check (step 134). Techniques to determine an image quality value associated with the front binary image of the check are known. Accordingly, details of such techniques will not be discussed. The specific manner in which the image quality value of the front binary image of the check is determined is not important to different embodiments of the present invention.

A determination is made (step 140) as to whether the quality value associated with the front binary image of the check is outside of a first predetermined threshold value. If the determination in step 140 is affirmative (i.e., the image quality value is outside of the first predetermined threshold value), then this is an indication that the quality of the front binary image of the check is bad and unusable. When this occurs, the transport mechanism 70 reverses the direction of transport (step 142) to convey the check to the check input/output slot 56 to return the check to the ATM customer via the check input/output slot. The ATM customer is then alerted of a bad quality check (step 144). However, if the determination in step 140 is negative (i.e., the image quality value is not outside of the first predetermined threshold value), then the process proceeds to step 150.

A determination is then made (step 150) as to whether the image quality value associated with the front binary image of the check is outside of a second predetermined threshold value which is different from the first predetermined threshold value. If the determination in step 150 is affirmative (i.e., the image quality value is outside of the second predetermined threshold value), then this is an indication that the quality of the front binary image of the check is good and usable. The binary images (i.e., both the front and back images) derived in step 132 are electronically transmitted to a back office facility of an institution (step 152), such as a financial institution in the form of a bank, for further processing at the back office facility. The check is then transported to the storage bin 78 (step 154).

It should be noted that the institution may or may not own the particular ATM 10 at which the check has been deposited. The location of the ATM 10 is remote from the back office facility such that it would be relatively costly for a service operator to be dispatched to the location of the ATM to retrieve a physical check. The ATM 10 is located at the point of presentment of the original check. The point of presentment is distant and away from the check clearing facility (i.e., the back office facility) which processes checks.

However, if the determination in step 150 is negative (i.e., the image quality value is not outside of the second predetermined threshold value), then the process proceeds to step 156. In step 156, the non-binary images of the check (i.e., the grayscale images in this example) are electronically transmitted to the back office facility for further processing at the back office facility. The check is then transported to the storage bin 78 (step 158).

It should be apparent that the grayscale images of the check are electronically transmitted to the back office facility when the image quality of the front binary image is determined to be neither bad enough to be unusable nor good enough to be usable. Such a determination indicates that the usability of the front binary image is either suspect or problematic. Accordingly, it should also be apparent that this determination occurs when the image quality value associated with the front binary image of the check is between the first and second predetermined threshold values.

It is conceivable that the second predetermined threshold value may be less than the first predetermined threshold value. In this case, the binary images of the check are electronically transmitted to the back office facility (i.e., the check is accepted for deposit) when the check image quality value is above the first predetermined threshold value. Also, in this case, the check is returned to the ATM customer (i.e., the check is not accepted for deposit) when the check image quality value is below the second predetermined threshold value.

It is also conceivable that the second predetermined threshold value may be greater than the first predetermined threshold value. In this case, the binary images of the check are electronically transmitted to the back office facility (i.e., the check is accepted for deposit) when the check image quality value is below the first predetermined threshold value. Also, in this case, the check is returned to the ATM customer (i.e., the check is not accepted for deposit) when the check image quality value is above the second predetermined threshold value.

A number advantages result by providing a method and image-based self-service check depositing terminal in accordance with different embodiments of the present invention. One advantage is that a relatively higher percentage of checks are accepted for deposit. This occurs because usable grayscale images of the check are electronically transmitted to the back office facility when usability of the binary images of the check is questionable (i.e., either suspect or problematic). For example, if quality of binary images of checks is determined to be good enough and acceptable 60% of the time, and quality of binary images of checks is determined to be not good enough and unacceptable 5% of the time, then acceptance of the remaining 35% using grayscale images of checks increases the total acceptance level to 95% of the time. It should be noted that in the majority of instances where the image quality of a binary image of a check is determined to be suspect or problematic, the corresponding grayscale image is usable.

Another advantage is that this increased total acceptance level is provided with minimal impact to ATM network bandwidth and storage requirements. This is because binary images are usually compressed (using known image compression techniques) and require substantially less bandwidth to transmit across a network and substantially less storage memory to store than grayscale images.

Although the above-description describes a check image quality value being determined for only the front binary image of the check, it is conceivable that a check image quality value may be determined for both the front and back images of the check. Moreover, it is conceivable that a check image quality value may be determined for only the back binary image of the check.

Also, although the above-description describes only grayscale image data being transmitted to the back office facility when the image quality value associated with the front binary image of the check is between the first and second predetermined threshold values, it is conceivable that both grayscale image data and binary image data be transmitted to the back office facility when the image quality value associated with the front binary image of the check is between the first and second predetermined threshold values.

Also, although the above-description describes a check being deposited in its entire amount by an ATM customer, it is conceivable that the check may be deposited only in partial amount of the entire amount of the check at the ATM 10, with the remaining amount of the check being cashed and delivered to the ATM customer. Checks may be of different sizes, different thicknesses, or different weights of paper.

Further, although the above-description describes the PERSONAS (trade mark) 5878 NCR ATM embodying the present invention, it is conceivable that other models of ATMs, other types of ATMs, or other types of self-service terminals may embody the present invention. Self-service terminals are generally public-access devices that are designed to allow a user to conduct a transaction or to access information in an unassisted manner and/or in an unattended environment. Self-service terminals typically include some form of tamper resistance so that they are inherently resilient. Self-service terminals allow users to obtain information or to conduct a transaction. Self-service terminals include: ATMs; non-cash kiosks that allow users to access information (e.g., to view reward points on a reward card the user inserts into the self-service terminal); and kiosks that accept payment for services (e.g. Web surfing kiosks, kiosks that allow users to buy goods, etc.). The term self-service terminal has a relatively broad meaning and includes vending machines.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating a publicly-accessible image-based self-service check depositing terminal, the method comprising:
   receiving from a self-service depositor customer a check to be deposited;
   capturing image data which is representative of a first check image;
   electronically by a computer binarizing the captured image data to provide binarized data which is representative of a second check image which is different from the first check image and which second check image is a binary form of the first check image;
   electronically by a computer determining a check image quality value associated with the second check image which is different from the first check image;

electronically by a computer comparing the check image quality value with a first threshold value;

electronically by a computer transmitting the second check image which is different from the first check image to a back office facility of an institution when the check image quality value is outside of the first threshold value;

electronically by a computer comparing the check image quality value with a second threshold value which is different from the first threshold value;

returning the check to the self-service depositor customer when the check image quality value is outside of the second threshold value; and electronically by a computer transmitting the first check image which is different from the second check image to a back office facility of an institution when the check image quality value is between the first and second threshold values.

2. A method according to claim 1, wherein (i) the second threshold value is less than the first threshold value, and (ii) the second check image which is different from the first check image is transmitted to the back office facility of the institution when the check image quality value is above the first threshold value, and (iii) the check is returned to the self-service depositor customer when the check image quality value is below the second threshold value.

3. A method according to claim 1, wherein (i) the second threshold value is greater than the first threshold value, and (ii) the second check image which is different from the first check image is transmitted to the back office facility of the institution when the check image quality value is below the first threshold value, and (iii) the check is returned to the self-service depositor customer when the check image quality value is above the second threshold value.

4. A method according to claim 1, wherein (i) the first check image comprises a grayscale check image, and (ii) the second check image comprises a binary image which is a binary form of the grayscale check image.

5. A method according to claim 1, wherein (i) the first check image comprises a color check image, and (ii) the second check image comprises a binary image which is a binary form of the color check image.

6. A method according to claim 1, wherein the image-based self-service depositing terminal comprises an image-based check depositing automated teller machine (ATM).

7. A method of operating an image-based check depositing automated teller machine (ATM), the method comprising:

receiving from an ATM customer a check to be deposited;

capturing image data which is representative of a first check image;

electronically by a computer binarizing the captured image data to provide binarized data which is representative of a second check image which is different from the first check image and which second check image is a binary form of the first check image;

electronically by a computer determining a check image quality value associated with the second check image which is different from the first check image;

electronically by a computer comparing the check image quality value with a first threshold value and a second threshold value which is different from the first threshold value; and electronically by a computer transmitting the first check image which is different from the second check image to a back office facility of an institution when the check image quality value is between the first and second threshold values.

8. A method according to claim 7, wherein (i) the second threshold value is less than the first threshold value, and (ii) the second check image which is different from the first check image is transmitted to the back office facility of the institution when the check image quality value is above the first threshold value, and (iii) the check is returned to the ATM customer when the check image quality value is below the second threshold value.

9. A method according to claim 7, wherein (i) the second threshold value is greater than the first threshold value, and (ii) the second check image which is different from the first check image is transmitted to the back office facility of the institution when the check image quality value is below the first threshold value, and (iii) the check is returned to the ATM customer when the check image quality value is above the second threshold value.

10. A method according to claim 7, wherein (i) the first check image comprises a grayscale check image, and (ii) the second check image comprises a binary image which is a binary form of the grayscale check image.

11. A method according to claim 7, wherein (i) the first check image comprises a color check image, and (ii) the second check image comprises a binary image which is a binary form of the color check image.

12. An image-based self-service check depositing terminal, the image-based self-service check depositing terminal comprising:

a transport mechanism for receiving from a self-service depositor customer a check to be deposited;

an imaging camera for capturing image data which is representative of a first check image; and an electronic controller for (i) electronically binarizing the captured image data to provide binarized data which is representative of a second check image which is different from the first check image and which second check image is a binary form of the first check image, (ii) electronically determining a check image quality value associated with the second check image which is different from the first check image, (iii) electronically comparing the check image quality value with a first threshold value, (iv) electronically transmitting the second check image which is different from the first check image to a back office facility of an institution when the check image quality value is outside of the first threshold value, (v) electronically comparing the check image quality value with a second threshold value which is different from the first threshold value, (vi) providing an electronic control signal to control the transport mechanism to return the check to the self-service depositor customer when the check image quality value is outside of the second threshold value, and (vii) electronically transmitting the first check image which is different from the second check image to a back office facility of an institution when the check image quality value is between the first and second threshold values.

13. An image-based self-service check depositing terminal according to claim 12, wherein (i) the second threshold value is less than the first threshold value, and (ii) the second check image which is different from the first check image is transmitted to the back office facility of the institution when the check image quality value is above the first threshold value, and (iii) the check is returned to the self-service depositor customer when the check image quality value is below the second threshold value.

14. An image-based self-service check depositing terminal according to claim 12, wherein (i) the second threshold value is greater than the first threshold value, and (ii) the second check image which is different from the first check image is transmitted to the back office facility of the institution when the check image quality value is below the first threshold value, and (iii) the check is returned to the self-service depositor customer when the check image quality value is above the second threshold value.

15. An image-based self-service check depositing terminal according to claim 12, wherein (i) the imaging camera comprises a grayscale imaging camera which captures a grayscale check image of the check, (ii) the grayscale check image is binarized to provide a binary check image which is a binary form of the grayscale check image.

16. An image-based self-service check depositing terminal according to claim 12, wherein (i) the imaging camera comprises a color imaging camera which captures a color check image of the check, (ii) the color check image is binarized to provide a binary check image which is a binary form of the color check image.

17. An image-based self-service check depositing terminal according to claim 12, wherein the image-based self-service depositing terminal comprises an image-based check depositing automated teller machine (ATM).

* * * * *